United States Patent [19]

Cooke et al.

[11] Patent Number: 4,495,849
[45] Date of Patent: Jan. 29, 1985

[54] REMOTELY ACTIVATED CABLE CUTTER

[75] Inventors: Michael W. Cooke, El Cajon; Arturo Arriola, San Diego; Julius M. Stegman, Del Mar; Kenneth D. Collins, San Diego, all of Calif.

[73] Assignee: The United States of America as represented by the Secretary of the Navy, Washington, D.C.

[21] Appl. No.: 424,818

[22] Filed: Sep. 27, 1982

[51] Int. Cl.³ .................. B26D 1/00; B63B 43/00
[52] U.S. Cl. .................. 89/1.14; 30/DIG. 4; 30/180; 114/221 A
[58] Field of Search ............ 89/1 B; 30/DIG. 4, 180; 114/221 A; 102/420, 419, 416, 412, 427, 206; 244/149

[56] References Cited

U.S. PATENT DOCUMENTS

| | | | |
|---|---|---|---|
| 2,716,813 | 9/1955 | Smyres | 30/DIG. 4 |
| 2,920,532 | 1/1960 | McBride | 89/1 B |
| 3,175,289 | 3/1965 | Wilterdink et al. | 30/180 |
| 3,246,396 | 4/1966 | Temple et al. | 30/DIG. 4 |
| 3,267,573 | 8/1966 | Hill | 30/228 |
| 3,308,781 | 3/1967 | Kurtz | 114/221 A |
| 3,353,267 | 11/1967 | Temple et al. | 30/180 |
| 3,765,331 | 10/1973 | Montesi | 89/1 B X |
| 3,886,842 | 6/1975 | Giebel et al. | 89/1 B |
| 3,996,687 | 12/1976 | Helbling | 42/84 |
| 4,128,071 | 12/1978 | Layman et al. | 89/1 B X |
| 4,207,819 | 6/1980 | Geren | 102/420 |
| 4,227,663 | 10/1980 | Ramsey et al. | 244/149 |
| 4,369,709 | 1/1983 | Backstein et al. | 102/420 X |

Primary Examiner—David H. Brown
Attorney, Agent, or Firm—Robert F. Beers; Ervin F. Johnston; Edmund W. Rusche, Jr.

[57] ABSTRACT

This invention improves on explosively actuated cable cutters in that it incorporates a remote capability of activating the cutter. The improved apparatus comprises an acoustical transducer for receiving a remote coded signal, an electric circuit designed to detect the specific coded signal, a motor and gear mechanism which is initiated upon detection of the remote coded signal to activate the explosively actuated cable cutter.

The electronics and motor compartment are hydrostatically sealed and pitted with a pressure switch and a water intrusion fail-safe circuit. The pressure switch is designed to inactivate the apparatus beyond a preset ocean depth, and the water intrusion fail-safe circuit is designed to detect any seawater seepage into the sealed electronics compartment. Upon the detection of such seepage the intrusion fail-safe circuit disconnects the system from the battery thereby removing danger of premature triggering of the cable cutter.

10 Claims, 7 Drawing Figures

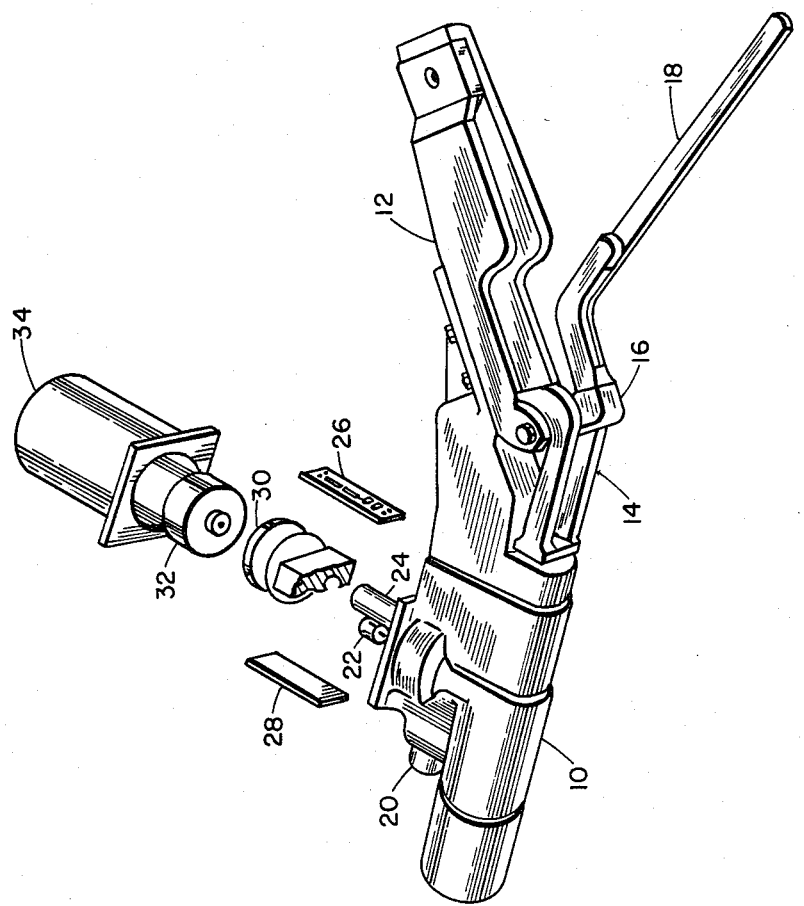
FIG. 1. EXPLODED VIEW OF CABLE CUTTER

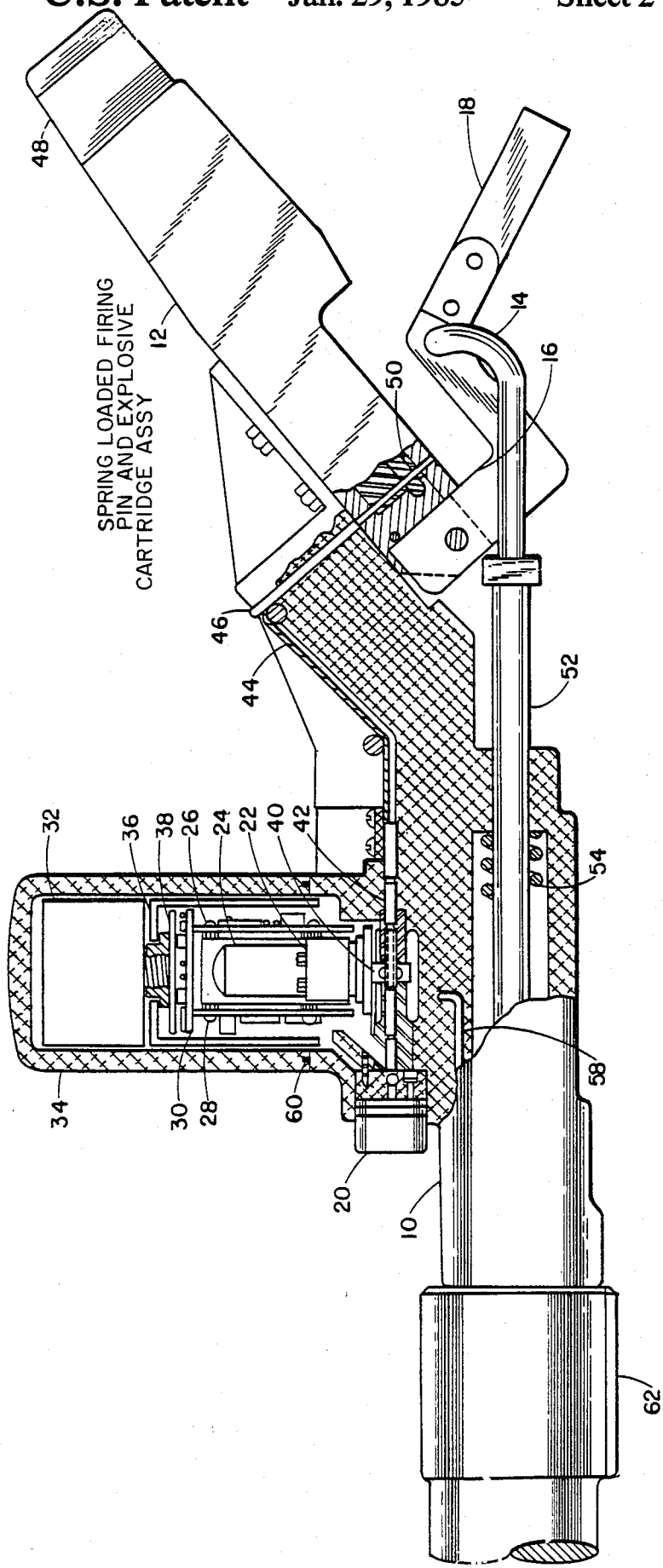
FIG. 2. CROSS-SECTION VIEW OF THE CABLE CUTTER.

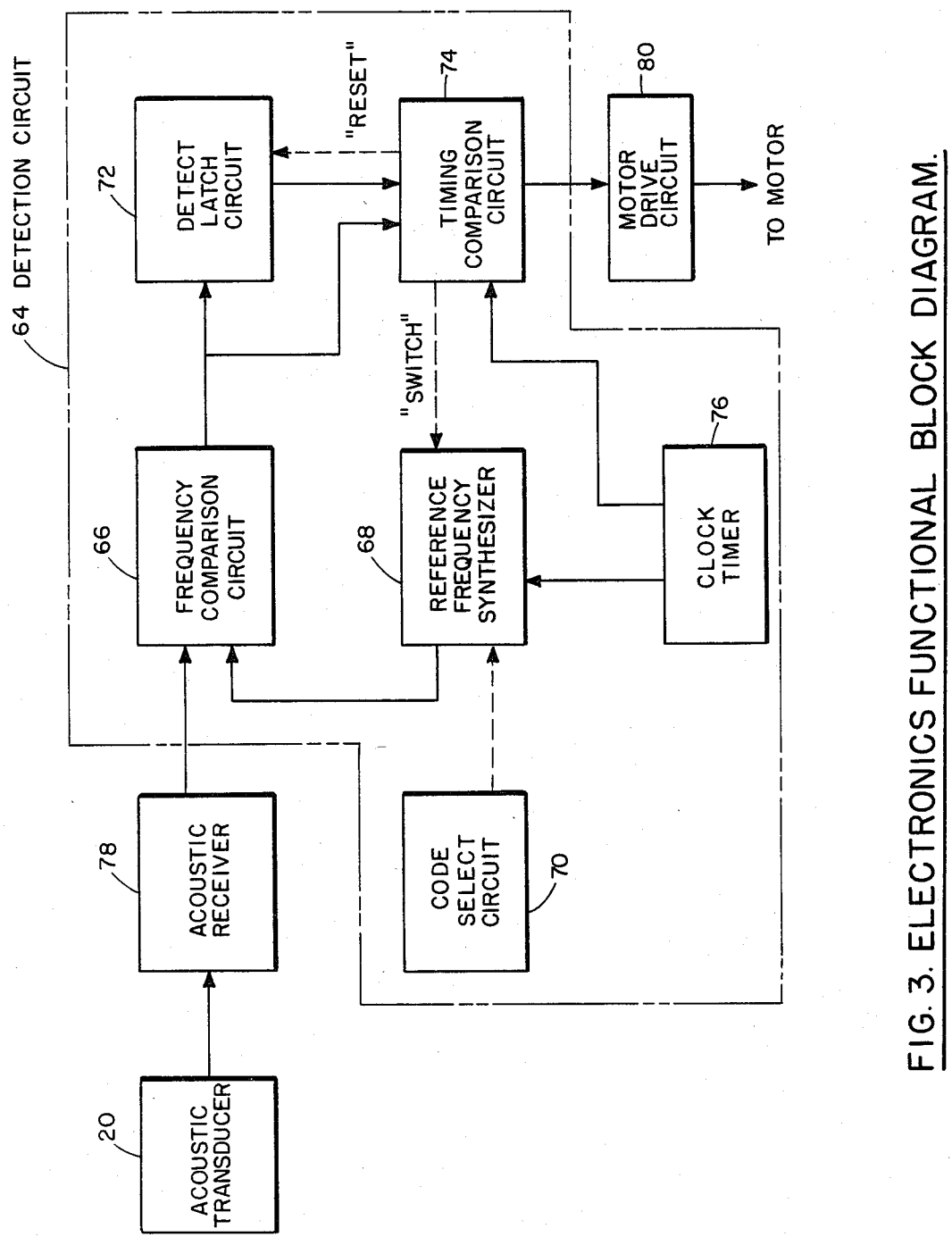
FIG. 3. ELECTRONICS FUNCTIONAL BLOCK DIAGRAM.

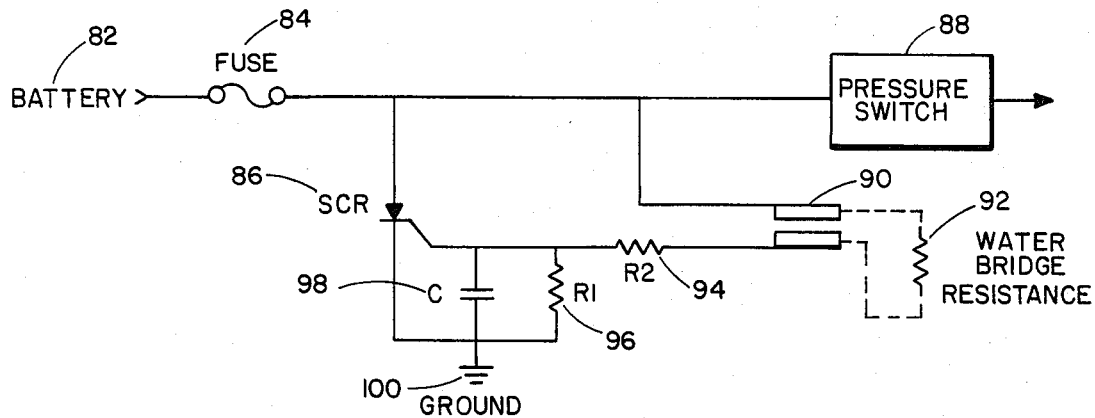
FIG. 4. WATER INTRUSION FAIL-SAFE CIRCUIT.
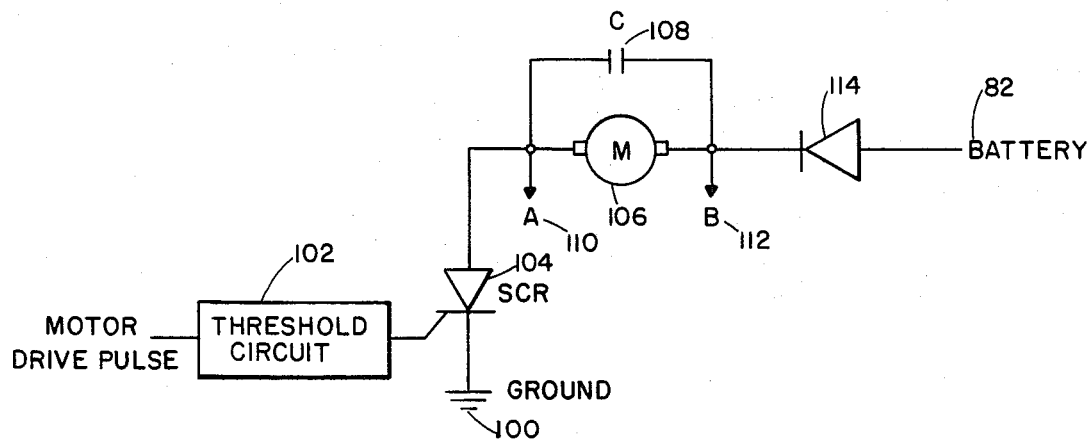
FIG. 5. MOTOR DRIVE CIRCUIT.

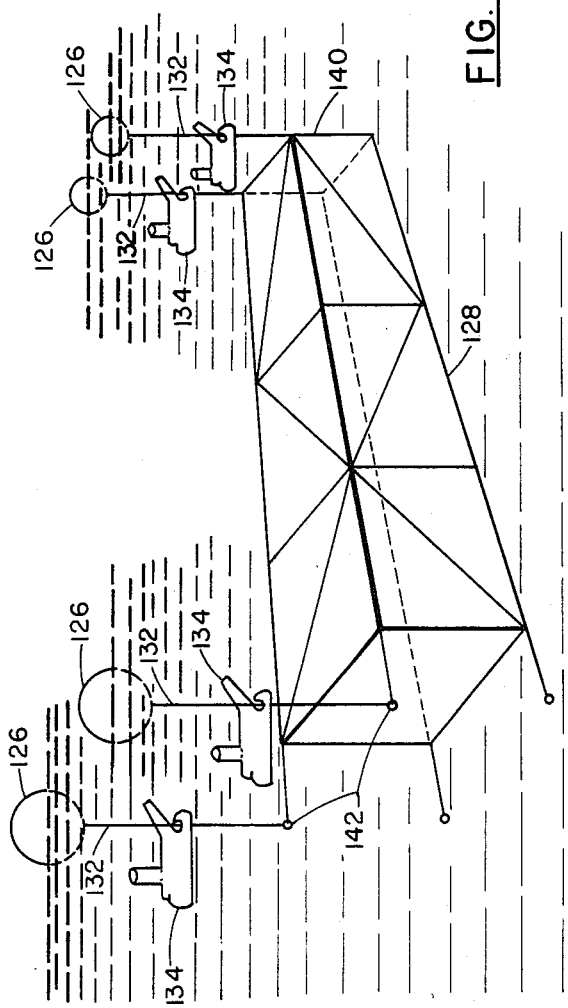
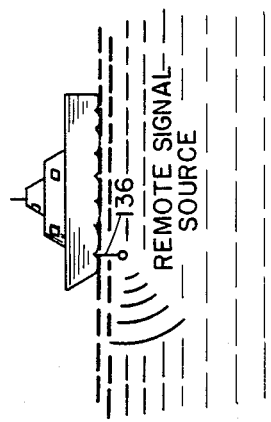
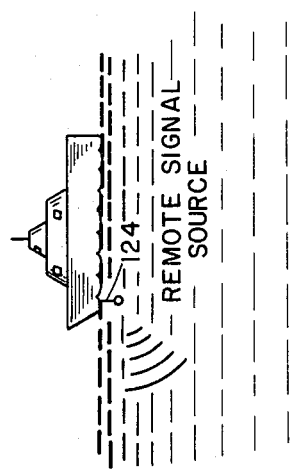
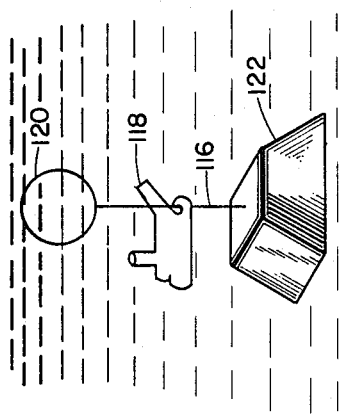
FIG. 7. PROGRAMMED MULTIPLE CABLE CUTTING.
FIG. 6. SINGLE CABLE CUTTING.

REMOTELY ACTIVATED CABLE CUTTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The need to cut cables underwater is of great importance to marine engineering. With the expansion of moored systems, e.g., data buoys to underwater anchors, methods at cutting the cables attaching such systems to the anchors have become of great interest. Devices have been designed and constructed of all types for the purpose of cutting these cables.

Mechanically, most cable cutters utilize an anvil and cutter combination powered by some means to cause the cutter to sever a cable by impinging it against the anvil. Many prior systems have been entirely mechanical in operation. Later systems have introduced explosive methods of actuating the cutter against the anvil. Such actuation is initiated by mechanical means at the time the cutter is attached to the cable to be cut, or by some form of a time delay. Various forms of time delays have included trip wires, electrical detonation wires, as well as through delayed mechanical contact with the cable to be cut.

The utility of a cable cutter which is remotely actuated depends on several factors. One factor is the requirement to activate the cutter from a remote position for purposes of safety. A second factor is the desire to activate the cutter remotely at a preselected chosen time.

A particular desire for remotely controlled cable cutting is to have the ability to activate several separate cable cutters according to a preplanned sequence in a manner that firing of one cutter does not interfere with the firing of any other cutter. This capability leads to a very valuable method of planning the cutting of multiple cables through remote commands as part of a time sequence of events. Such a requirement occurs where large items tethered by several cables are to be cut such that the items released will either float to the surface in a predetermined orientation, or vice verse, are to be cut from a surface vehicle to float and settle on the bottom in a predetermined orientation.

SUMMARY OF THE INVENTION

An apparatus and method is disclosed for a remotely actuated cable cutter which is triggered by an acoustical preprogrammed and coded signal. Thus, several cables can be severed simultaneously upon a remote discrete command or separately as part of a precisely timed sequence of events.

The cutter is an improvement on presently existing art wherein the mechanical portion of the cutter is essentially a pair of hooks which guide and hold a cable on an anvil against which a cutter is driven by the detonation of an explosive cartridge. This invention has improved on the prior art by adding a self-contained electronic circuit and motor which is activated through a received acoustic coded signal from a remote emitter. Upon receiving and detecting the coded signal, the electronics control circuit activates the motor to move a lead screw shaft which pulls an initiator wire causing the release of a pin from a cocked firing plunger. When this pull pin is removed, the firing plunger under spring tension is released to actuate the firing of the explosive charge thereby causing the cutter to cut the cable.

The invention has been fitted with a pressure switch which is designed to conserve power by activating the power only when the cutter has been taken to a certain depth in the ocean. Another safety system protects the electronics and motor from premature actuation by detecting any seawater that should leak into the pressure housing. This water intrusion safety device upon detection of seawater will cause a surge current from the battery to short circuit to ground thereby blowing a fuse which disconnects the battery from use. Otherwise, a seawater short could cause the motor to turn on prematurely causing an untimely firing of the cutter.

The invention is capable of having the activating acoustic coded signal preset in a manner that is unique. Therefor, it cannot be accidentally triggered unless and until a coded signal matching the programmed coded signal is received. This capability allows several cutters to be used in an area for severing many cables either simultaneously through a single remote command signal or as a part of a timed sequence of events via several remote command signals.

OBJECTS OF THE INVENTION

An object of the invention is to provide an improved apparatus that cuts underwater cables upon activation by remote control.

A second object is to provide an improved underwater cable cutter which is explosively actuated by remote underwater acoustic signals.

Another object is to provide an improved underwater explosive actuated cable cutter which is detonated by remotely emitted coded acoustic signals.

A further object is to provide an improved explosively actuated underwater cable cutter which can be remotely controlled by acoustic coded signals that are preprogrammed so that several underwater cable cutters can be used without interfering with one another's operation.

A still further object is to present an improved explosively actuated underwater cable cutter remotely controlled by coded acoustic signals and a method whereby large underwater devices tethered by multiple cables can be released to either float to the surface or sink with the devices orientation controlled by the preprogrammed method of cutting the multiple cables.

These and other objects of the invention will become more readily apparent from the ensuing specification when taken together with the drawings.

DESCRIPTION OF THE DRAWINGS

FIG. 1 is an exploded view of the cable cutter.

FIG. 2 is a cross-section view of the cable cutter which shows the electronics.

FIG. 3 is an electronics function block diagram which displays the basic electronic functions for receiving the coded trigger signals and controlling the motor operation.

FIG. 4 is a diagram of the water intrusion fail safe circuit.

FIG. 5 is a diagram displaying the DC motor drive circuit.

FIG. 6 is a diagram showing a cable cutter attached to the cable of a tethered buoy which displays single cable cutting.

FIG. 7 is a diagram displaying a method for programmed multiple cable cutting.

DESCRIPTION OF THE PREFERRED EMBODIMENT

The exploded view of the cable cutter shown in FIG. 1 clearly displays the pertinent aspects of the invention. Shown is a cable cutter body 10, an attached explosive actuated cutter housing 12, a clamp hook 14, an anvil 16, and an extended guide bar 18. These items can be considered as part of prior art and are not claimed as particular improvements covered in this invention.

Also shown as parts of the improvements included in this invention is an acoustic transducer 20, a pressure switch 22, a motor 24, electronics boards 26 and 28, a code select circuit 30, a battery 32, and a pressure housing 34. These items are also shown in the cross-sectional view of FIG. 2.

Referring to FIGS. 1 and 2, it is to be noted that the cable cutter body 10 has connected to it the explosive actuated cutter housing 12. The cable cutter body is carried by an installation/removal assembly 62 during the process of attaching the cable cutter to a cable to be cut. The cable to be cut is guided to the anvil 16 by the extended guide bar 18 at which time clamp hook 14 grasps the cable through the action of a spring 54 and a clamp arm 52. Once the cable is firmly grasped, installation/removal assembly 62 releases cable cutter body 10. Following this the attaching mechanism, whether it be an undersea submersible vehicle, a marine mammal, or a human diver, may retreat to a safe position for actuation of a remote triggering signal.

The explosive actuated firing mechanism is contained within housing 12 and through access of a breechblock 48 the explosive cartridge may be inserted or removed. A firing plunger 50 is shown as part of the actuator assembly.

This firing plunger is pierced by a hole containing a pull-pin 46 when in a cocked position prior, or awaiting, firing of the cutter mechanism. When pull-pin 46 is pulled from the hole of firing plunger 50, the firing plunger is spring released to cause the explosive cartridge to fire and propel a chisel towards anvil 16 thereby cutting any cable held thereon.

Pull-pin 46 is shown connected to an initiator wire 44. The initiator wire is rolled around a guide pin so that its attachment to pull-pin 46 is in a manner that the axis of the pull-pin and the wire are colinear. Initiator wire 44 is connected at its other end to a lead screw shaft 42. Lead screw shaft 42 is fitted with a gear arrangement 40 in contact with gearing on the drive shaft of motor 24.

The motor when actuated, causes the lead screw shaft to be moved along its axis putting tension on the initiator wire. This tension causes pull-in 46 to be pulled from the hole in firing plunger 50 which causes actuation of the explosive cartridge in the cutter.

During preliminary setup of the cable cutter the motor may be adjusted by operating it in reverse such that slack is provided to initiator wire 44. This allows the insertion of pull-in 46 into the hole in firing plunger 50 thereby arming the device.

Control of the motors action and operation is accomplished by an electronic control circuit contained on electronics boards 26 and 28. In addition, code select circuit 30 is part of the electronic circuit for the purpose of allowing the operator the capability of preselecting a specific signal code which when received will activate operation of the cable cutter. An electronics cover 36 shields the electronics units and battery 32 provides power to the units.

In this particular embodiment pressure switch 22 has been incorporated to keep the battery disconnected from providing power unless a certain pressure is attained which activates the pressure switch to close the battery circuit to the electronics. The pressure switch is controlled by the pressure from the surrounding hydrostatic environment received through a pressure switch pressure path 58. When the cable cutter has been taken to the proper depth and the pressure is correct, pressure switch 22 activates and closes circuits so that the battery will provide power to the electronics.

The above components, the electronics assemblies, the battery, the motor, and the pressure switch, must be kept dry from the surrounding seawater. A pressure housing 34 encapsules these components and is sealed through an O-ring seal 60 to provide a pressurized and hydrostatically secure compartment. As a fail-safe measure, should seawater accidentally invade the compartment housed by the pressure housing, the seawater could cause a short of the electronics which would result in premature operation of the motor. Premature firing of the cable cutter would then follow. To protect against such an event, a water instrusion fail-safe circuit 38 has been installed. This circuit, which will be described in more detail later, causes a short circuit of the battery if seawater is detected within pressure housing 34.

Also shown is acoustic transducer 20 which may be a hydrophone connected to the electronic circuits. The acoustic transducer will pick up a remotely transmitted coded pulse signal designed to cause activation of the cable cutter through the electronics circuitry.

FIG. 3 shows the electronic circuitry in a functional block diagram. The acoustic transducer 20 feeds its received signal to an acoustic receiver 78 which basically amplifies and bandpass filters this signal. The signal is then fed to a detection circuit 64.

The detection circuit is displayed in FIG. 3 but is not part of the claimed improvements in this invention. However for reference purposes the functional components of detection circuit 64 are set forth here. They include taking the output signal from the acoustic receiver into a frequency comparison unit 66 which also receives a reference frequency generated by reference frequency synthesizer 68. The reference frequency synthesizer receives its directions concerning what frequency to synthesize from a code select circuit 70. This code select circuit has been shown physically as item 30 in FIGS. 1 and 2. If an initial frequency received through the acoustic transducer matches the reference frequency synthesized a signal pulse is emitted by frequency comparison circuit 66 which is transmitted to a detect latch circuit 72 and a timing comparison circuit 74.

At some predetermined time after receipt of this signal pulse timing comparison circuit 74 emits a switch signal to reference frequency synthesizer 68. The reference frequency synthesizer then synthesizes a second frequency according to directions from code select circuit 70 and transmits this second reference frequency to frequency comparison circuit 66.

The time of the coded frequency signals is measured and compared via timing comparison circuit 74. Upon the first signal pulse emitted by frequency comparison circuit 66 the detect latch circuit has set and emits a signal to timing comparison circuit 74.

If a properly coded second frequency signal comes in and is positively identified with the second reference frequency a second pulse signal is emitted by frequency comparison circuit 66 which also proceeds to the timing comparison circuit. If the time interval between the first detected frequency and the second detected frequency is correct then a signal pulse is emitted from the timing comparison circuit to a motor drive circuit 80. If the timing was not correct between the two received frequencies or if there was no second frequency to be detected within the code a reset signal is emitted from timing comparison circuit 74 to return detect latch circuit 72 to its original standby condition awaiting a first coded frequency for detection again.

A clock timer 76 provides timing control to reference frequency synthesizer 68 and to timing comparison circuit 74.

The motor drive circuit 80 once activated, then causes power to be transmitted to the motor which thereafter pulls the pull-pin and fires the cable cutter mechanism.

FIG. 4 shows a circuit diagram for the water intrusion fail-safe circuit. This circuit interrupts any possible flow of current from a battery 82 to eventually power motor 30 prematurely if seawater leakage occurs within the electronics package. It is to be noted that battery 82 shown in FIG. 4 is equivalent to the physical depiction of the battery in FIGS. 1 and 2 as noted by item 32 in those FIGS. The circuit contains a fuse 84 attached to the output positive terminal of the battery. This fuse is in the circuit line which eventually travels to the motor and, once blown, blocks any possible power arriving at the motor.

Attached at the end opposite to battery connected end of the fuse is the anode terminal of a silicon controlled rectifier 86. The gate terminal of the silicon controlled rectifier is connected via a resistor 94 to one sensor of a capacitative bridge sensor. A second sensor of the capacitative bridge sensor is also connected to the end of the fuse opposite the positive terminal of the battery. The cathode terminal of silicon controlled rectifier 86 is connected to ground. Between the gate terminal of the silicon controlled rectifier and R2 are a capacitor 98 and a resistor 96 connected in parallel to ground.

Operation of this circuit is activated when water intrudes and causes a resistive circuit to occur between the sensors of the capacitative bridge sensor 90. Such a seawater short is depicted as a water bridge resistance 92.

Once this condition occurs this voltage divider network will supply a sufficiently high potential at the gate terminal of the silicon controlled rectifier to allow it to conduct. As the silicon controlled rectifier goes into conduction, its anode to cathode surge current blows fuse 84 providing the desired power disconnect. Capacitor 98 prevents spurious noise spikes from accidentally turning on the silicon controlled rectifier. The sensor probes of the capacitative bridge sensor actually consists of two concentric conductive bands etched on both sides of a circular printed wiring board.

FIG. 5 shows the circuit for the motor drive operation. A second silicon controlled rectifier 104 is used to trigger operation of the motor. This silicon controlled rectifier is open circuited until a significant voltage is detected at its gate terminal to trigger it to the on condition.

Silicon controlled rectifier 104 is connected with its anode terminal to the ground side terminal of a motor 106. This motor has been displayed in FIGS. 1 and 2 physically as item 24. In this embodiment a direct current motor is being used. The other terminal of the motor is connected to receive power from the power terminal of the battery. A capacitor is shown in this embodiment connected in parallel with the motor terminals A and B. The motor may be reversed by applying a negative DC voltage probe to terminal B and a positive probe to terminal A. For this operation, a diode 114 is placed in series with the motor to protect the input of the voltage regulator while the motor is being reversed. Current can only flow through the motor because both diode 114 and silicon controlled rectifier 104 are reverse biased.

For operation of the cable cutter the motor is turned on by a motor drive pulse received from motor drive circuit 80. This drive pulse occurs only after the appropriate acoustic code has been received and detected by detection circuit 64. The drive pulse provides a sufficient potential at the gate terminal of silicon controlled rectifier to trigger it to a conduction mode which closes the power circuit of the motor thereby initiating its operation. A threshold circuit 102 is inserted to pass the motor drive pulse and to prevent noise spikes from triggering the silicon controlled rectifier.

The application of this remote controlled cable cutter is quite versatile. A multiple of techniques are available for its employment. FIG. 6 shows its employment for cutting a single cable buoyed to the bottom of an ocean area. The cable cutter 118 is shown attached to a cable 116 which is to be cut releasing a buoy 120 from an anchor 122, thereby allowing buoy 120 to float to the surface. Triggering of cable cutter 118 occurs from a remote signal source 124 shown in FIG. 6 as mounted to a surface vessel which can be placed at a safe distance away from the release point.

It is obvious that fields of multiple buoys may be released from the remote signal source by using separate cable cutters adjusted with separate coded signal programs and attached to each of the cables. By such method all cables may be preprogrammed to be cut simultaneously, or in the alternative, may be preprogrammed to be cut in a preselected sequential fashion.

FIG. 7 shows an example of multiple cable cutting techniques which could require the preprogramming of a predetermined sequential cable cutting series of events. As shown, an underwater tower 128 is supported from the surface of the ocean by buoys 126 through the use of cables 132. Cable cutters 134 have been attached to each cable 132.

Each cable cutter 134 is preprogrammed to be activated upon receipt of its own preselected coded signal. The preprogrammed sequence can be adjusted such that the cable cutters attached to the cables holding up a lower end or base 142 of tower 128 are cut first. This procedure allows the base to begin sinking while an apex or top 140 of tower 128 remains attached to buoys holding it in place. The base 142 of the tower will swing down and the tower will approach the desired vertical orientation. At the time vertical orientation is accomplished, the cable cutters attached to the cables holding top part 140 of tower 128 are activated to cut their respective cables. This then will allow the tower to settle to a position on the bottom of the ocean area in a manner that the tower will be erect.

Clearly such a programmed method of sequentially cutting cables to control orientation of vessels to be installed in the ocean may be reversed for a similar preprogrammed procedure in cutting cables of vessels which are moored to the bottom but are to be returned to the surface in a predetermined orientation. Also it is clear that the remote coded signal may be emitted from a multitude of select sources located at distances removed from the cables to be cut.

Obviously, many modifications and variations of the present invention are possible in the light of the above teachings. It is therefore to be understood that within the scope of the appended claims the invention may be practiced otherwise than as specifically described.

What is claimed is:

1. An improved underwater cable cutter which can be attached by submersible vehicles, marine mammals or human divers to cables to be cut, said cable cutter having a chisel and anvil assembly whereby a chisel is activated by a spring loaded firing pin which strikes an explosive cartridge, wherein the improvement comprises:

means for holding firmly the spring loaded firing pin in a cocked position until a later predetermined time whereat the cocked position is to be terminated thereby allowing the firing pin to strike the explosive cartridge;

means connected to the holding means for removing the holding means from holding firmly the spring loaded firing pin in a cocked position, thereby allowing the firing pin to strike the explosive cartridge;

means in contact with the removing means for controlling the activation and operation of the removing means, said controlling means being activated in response to a predetermined coded signal received at an input to said controlling means;

means for admitting the coded signal, and connected to the input of the controlling means for inputting said signal to the controlling means, said preselected coded signal originating from a distant and separate source;

means connected to the removing means, the controlling means, and the admitting means for powering them; and means sealed to the cable cutter in a watertight manner for housing the removing means, the controlling means, and the powering means, said housing being capable of withstanding hydrostatic pressures at the depths found in the worlds oceans.

2. An apparatus according to claim 1 wherein the powering means further includes:

a pressure switch electrically connected between the powering means and the controlling means, the removing means and the admitting means, said pressure switch causing an open circuit blocking transmission of power to the controlling means, the removing means, and the admitting means until a preselected depth is reached where the pressure switch is activated by the hydrostatic pressure to close the circuit thereby allowing power to flow through.

3. An apparatus according to claim 1 or 2 wherein the holding means comprises:

a pull pin removably inserted in the spring loaded firing pin whereby said spring loaded firing pin is held in its cocked position; and an initiator wire tautly connected at one end to the removing means and at the other end to the pull pin wherein the removing means pulling on the taut initiator wire causes the pull pin to be pulled from its inserted position holding the spring loaded firing pin in its cocked position.

4. An apparatus according to claim 3 wherein the removing means comprises:

a lead screw shaft connected to the second end of the initiator wire, and fitted so that it may be controllably moved along a linear axis with the initiator wire, thereby putting tension on the initiator wire causing it to pull the pull pin; and a motor with its drive shaft in geared contact with the lead screw shaft, said motor providing the power to controllably move the lead screw shaft linearly along its axis.

5. An apparatus according to claim 4 wherein the controlling means comprises an electronics circuit which includes:

an acoustic receiver with an input connection for receiving electric signals from the admitting means and an output port, said acoustic receiver amplifying and bandpass filtering the received signal;

a detection circuit connected to the output port of the acoustic receiver, said detection circuit receiving input signals and analyzing such signals to detect preselected and programmed frequency and time coded activation signals; and a motor drive circuit connected to an output of the detection circuit, said motor drive circuit provides power to operate the motor upon activation by the detection circuit when the proper coded signal has been detected.

6. An apparatus according to claim 5 wherein the admitting means comprises:

an acoustic transducer for receiving acoustic signals which have traversed the underwater environment from a distant source.

7. An apparatus according to claim 6 wherein the powering means comprises:

a battery.

8. An apparatus according to claim 7 wherein the housing means comprises:

a pressure housing fitted with a watertightly sealed port through which the lead screw can slide.

9. An apparatus according to claim 8 wherein the electronic circuits of the controlling means further include a water-intrusion fail-safe circuit comprising:

a fuse connected between the power terminal of the battery and the input to the electronic circuits of the controlling means;

a first silicon-controlled rectifier with its anode terminal connected to the fuse terminal opposite the fuse terminal connection to the battery, and with its cathode terminal connected to ground;

a capacitative bridge sensor electrically connected by the first of its sensor terminals to the fuse terminal opposite the fuse terminal connection to the battery, the physically mounted at a select place within the controlling means where any undesired seawater leakage will cause a resistive short across the bridge's sensor terminals;

a first resistor connected between the second sensor terminal of the capacitative bridge sensor and the gate terminal of the first-silicon-controlled rectifier;

a second resistor connected between ground and the terminal of the first resistor opposite the terminal connected to the capacitive bridge sensor's second terminal; and a capacitor connected in parallel with the second resistor.

10. An apparatus according to claim 9 wherein the motor drive circuit comprises:

a second silicon-controlled rectifier connected with its cathode terminal to ground and its anode terminal to the ground side terminal of the motor, said second silicon-controlled rectifier being in an open circuit state before activation; and a threshold circuit connected between the gate terminal of the second silicon-controlled rectifier and the output of the detection circuit, said threshold circuit designed to prevent noise spikes from triggering the second silicon-controlled rectifier but to pass the pulse emitted by the detection circuit when the proper coded trigger signal has been detected.

* * * * *